United States Patent
Polly et al.

(10) Patent No.: US 10,450,893 B1
(45) Date of Patent: Oct. 22, 2019

(54) BEARING CENTERING SPRING AND DAMPER

(71) Applicant: United Technologies Corporation, Farmington, CT (US)

(72) Inventors: Joseph H. Polly, Tolland, CT (US); Sean P. McGee, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/264,989

(22) Filed: Feb. 1, 2019

(51) Int. Cl.
*F16C 27/04* (2006.01)
*F01D 25/16* (2006.01)
*F16F 15/02* (2006.01)
*F16C 19/14* (2006.01)
*F16C 33/78* (2006.01)
*F16C 33/58* (2006.01)

(52) U.S. Cl.
CPC ............ *F01D 25/164* (2013.01); *F16C 19/14* (2013.01); *F16C 33/583* (2013.01); *F16C 33/7816* (2013.01); *F16F 15/022* (2013.01); *F05D 2220/32* (2013.01); *F05D 2240/50* (2013.01); *F05D 2260/96* (2013.01); *F16C 2360/23* (2013.01); *F16F 2222/12* (2013.01); *F16F 2224/0208* (2013.01); *F16F 2230/30* (2013.01)

(58) Field of Classification Search
CPC ... F16C 27/045; F16C 2360/23; F16F 15/022; F01D 25/164
See application file for complete search history.

(56) References Cited

U.S. PATENT DOCUMENTS

| 5,215,384 | A | 6/1993 | Maier | |
| 7,625,121 | B2 * | 12/2009 | Pettinato | F16C 17/03 384/117 |
| 8,083,413 | B2 * | 12/2011 | Ertas | F16C 17/035 384/117 |
| 9,464,669 | B2 | 10/2016 | Kerr et al. | |
| 9,850,814 | B2 | 12/2017 | Grogg | |
| 9,926,975 | B2 | 3/2018 | Smedresman et al. | |
| 2013/0121858 | A1 * | 5/2013 | Sekita | F04D 29/059 417/423.12 |
| 2014/0072250 | A1 * | 3/2014 | Kern | F16C 32/0637 384/119 |
| 2015/0240867 | A1 | 8/2015 | Amador et al. | |
| 2016/0186607 | A1 | 6/2016 | Witlicki et al. | |
| 2017/0122369 | A1 | 5/2017 | Smedresman et al. | |

OTHER PUBLICATIONS

Bugra H. Ertas et al., "Synchronous Response to Rotor Imbalance Using a Damped Gas Bearing", J. Eng. Gas Turbines Power, 132(3), 032501, Dec. 1, 2009, The American Society of Mechanical Engineers, New York, NY.

\* cited by examiner

*Primary Examiner* — Thomas R Hannon
(74) *Attorney, Agent, or Firm* — Bachman & LaPointe, P.C.

(57) ABSTRACT

A machine has first and second members. A bearing has an inner race mounted to the second member and an outer race rotatable relative to the inner race about an axis. A ring holds the outer race. A radial spring extends radially between the ring and the first member. First and second damper rings extending radially between the ring and the first member at first and second axial sides of the radial spring. First and second damping chambers are radially between an outer diameter surface portion of the respective damper rings and an inner diameter surface portion of the first member.

16 Claims, 6 Drawing Sheets

BEARING CENTERING SPRING AND DAMPER

BACKGROUND

The disclosure relates to turbomachine bearings. More particularly, the disclosure relates to turbomachine bearing centering spring/damper systems.

Turbomachines, namely, gas turbine engines (broadly inclusive of turbofans, turbojets, turboprops, turboshafts, industrial gas turbines, and the like) have numerous rolling element (ball or roller) bearing systems intervening between one or more spools and static or fixed structure (e.g., the engine case). Various spring mounting/retaining systems exist such as to accommodate tolerance of the rotating components, vibration, inertial loading due to aircraft maneuvering, and the like. The spring action may be damped by a fluidic damper (e.g. a "squeeze-film" damper which may use bearing lubrication oil as the fluid). One genus of these systems involve springs which are often referred to as "squirrel cage" springs due to their geometry. In addition to the radial spring action, depending on implementation the spring may serve to axially position the associated bearing race.

One example of a squirrel cage retainer is disclosed in U.S. Pat. No. 9,464,669 (the '669 patent) of Kerr et al., Oct. 11, 2016, the disclosure of which is incorporated by reference in its entirety herein as if set forth at length. The term "squirrel cage" relates somewhat to the hamster wheel like appearance of the spring/retainer with two full annulus end portions separated by a center portion having a circumferential array of longitudinal beams or legs joining the two end portions and separated by gaps. The circumferential array of legs and gaps provides flexibility at a desired spring rate allowing excursions of the two end portions off their coaxial condition. In the '669 patent configuration, one of the ends (the proximal end and, in the example, forward end) comprises a mounting flange for mounting to the associated structure (e.g., static structure in that example). The opposite second end portion has features for bearing engagement and fluid damping. Specifically, the inner diameter (ID) surface of the second end portion is dimensioned to receive the outer diameter (OD) surface of the associated bearing outer race. The ID surface face may bear features for also axially retain/engaging the outer race.

The OD surface of the second portion bears two annular grooves. The grooves each carry a seal (e.g., a ring seal such as a piston ring seal (e.g., metallic), an elastomeric O-ring seal, spring-loaded carbon seal, or the like). The second portion is mounted in close sliding relationship surrounded by external structure including one or more fluid ports between the two grooves/seals. Pressurized fluid (e.g., oil) is introduced via the ports. The fluid in the damping chamber formed between the grooves/seals maintains a fluid film in the region between the grooves. This thin film (the "squeeze film") provides small amounts of displacement and damping. The natural frequency of the system is a function of the effective mass of the system, spring rate, and the squeeze-film damping. The presence of the two grooves and seals renders the configuration a "closed damper" configuration (although there will be small amounts of leakage past the seals).

A more complex configuration of squirrel cage is shown in U.S. Patent Application Publication No. 2017/0122369A1 (the '369 publication) of Smedresman et al., May 4, 2017, the disclosure of which is incorporated by reference in its entirety herein as if set forth at length. The '369 publication has a retainer wherein the first end portion also engages the outer race of a different bearing. In the '369 publication configuration, the forward portion of the retainer has a fluid damping relationship with the outer race of the associated bearing in a similar way as the static structure has to the second end portion of the retainer of the '669 patent.

Yet other variations are more complicated and have more convoluted cross-sectional profiles. For example, whereas the aforementioned examples have the squirrel cage center portion extending close to straight axially between two axial end portions, other configurations having jogs or zigzags in their axial cross-section are possible. Several such variations are variations disclosed in U.S. Patent Application Publication No. 2015/0240867A1 (the '867 publication) of Amador et al., Aug. 27, 2015, the disclosure of which is incorporated by reference in its entirety herein as if set forth at length.

A further zigzag configuration is shown in U.S. Patent Application Publication 2016/0186607A1 (the '607 publication) of Witlicki et al., Jun. 30, 2016, the disclosure of which is incorporated by reference in its entirety herein as if set forth at length where a two-piece spring/damper is created by having a squirrel cage spring extending axially between one axial end portion and a second axial end portion of that spring. However, the damper is formed along a second piece having a first axial end mounted to the second axial end of the spring and having a body extending axially back towards the spring first end portion to join a second end portion bearing the grooves for the seals for the damper. Thus, the first end portion of the spring which serves for mounting may be axially very close to the second end portion of the second piece which bears the damping features. Depending upon the situation, the second piece may itself have a squirrel cage spring construction or may be relatively rigid.

A similar damper configuration is the "open damper" which lacks the two grooves/seals. See, Bugra H. Ertas et al., "Synchronous Response to Rotor Imbalance Using a Damped Gas Bearing", J. Eng. Gas Turbines Power, 132(3), 032501, Dec. 1, 2009, The American Society of Mechanical Engineers, New York, N.Y. Such a configuration allows escape of fluid from the gap between spring and static structure. A greater supply of fluid will be required in an open damper relative to a similar closed damper and the configuration will have different damping characteristics.

A further variation is found in U.S. Pat. No. 9,850,814 (the '814 patent), of Grogg, Dec. 26, 2017, the disclosure of which is incorporated by reference in its entirety herein as if set forth at length. The '814 patent discloses use of a pair of annular additive manufactured springs that operate under local radial compression. To provide radial compliance, the springs are manufactured with annular inner and outer supports joined by flexible ligaments.

SUMMARY

One aspect of the disclosure involves a machine comprising: a first member; a second member; and a bearing. The bearing has an inner race mounted to the second member and an outer race rotatable relative to the inner race about an axis. A ring holds the outer race. A radial spring extends radially between the ring and the first member. A first damper ring extends radially between the ring and the first member at a first axial side of the radial spring. A first damping chamber is radially between an outer diameter surface portion of the first damper ring and an inner diameter surface portion of the first member. A second damper ring extends radially between the ring and the first member at a second axial side of the radial spring. A second damping chamber is radially between an outer diameter surface portion of the second damper ring and an inner diameter surface portion of the first member.

In additional or alternative embodiments of any of the foregoing embodiments, the radial spring comprises: an inner diameter band; an outer diameter band; and a compliant portion between the inner diameter band and the outer diameter band.

In additional or alternative embodiments of any of the foregoing embodiments, in transverse cross-section, the compliant portion has an open area fraction of at least 75%

In additional or alternative embodiments of any of the foregoing embodiments, the outer diameter band has an outer diameter surface having channels providing fluid communication between the first damping chamber and the second damping chamber.

In additional or alternative embodiments of any of the foregoing embodiments, one or more fluid passages extend through the first member in communication with the first damping chamber and the second damping chamber.

In additional or alternative embodiments of any of the foregoing embodiments, a first seal is between the first damper ring and the first member and a second seal is between the second damper ring and the first member.

In additional or alternative embodiments of any of the foregoing embodiments, the first seal is in an outer diameter groove in the first damper ring and the second seal is in an outer diameter groove in the second damper ring.

In additional or alternative embodiments of any of the foregoing embodiments, the first seal is a metallic ring and the second seal is a metallic ring.

In additional or alternative embodiments of any of the foregoing embodiments, a third seal is between the first damper ring and the radial spring and a fourth seal is between the second damper ring and the radial spring.

In additional or alternative embodiments of any of the foregoing embodiments, the ring holds the first damper ring, the radial spring, and the second damper ring under axial compression.

In additional or alternative embodiments of any of the foregoing embodiments, the radial spring comprises a sintered titanium alloy.

In additional or alternative embodiments of any of the foregoing embodiments, the machine is a gas turbine engine.

In additional or alternative embodiments of any of the foregoing embodiments, a method for using the machine comprises: driving relative rotation of the first member and second member; and introducing a liquid to the first damping chamber and the second damping chamber, the chambers accommodating radial vibration and the liquid in the chambers damping the radial vibration.

Another aspect of the disclosure involves a machine comprising: a first member; a second member; and a bearing. The bearing has an inner race mounted to the second member and an outer race rotatable relative to the inner race about an axis. Between the first member and the bearing outer race there are: a radial spring; a first damper ring at a first axial side of the radial spring, a first damping chamber radially between an outer diameter surface portion of the first damper ring and an inner diameter surface portion of the first member; and a second damper ring at a second axial side of the radial spring, a second damping chamber radially between an outer diameter surface portion of the second damper ring and an inner diameter surface portion of the first member.

In additional or alternative embodiments of any of the foregoing embodiments, the radial spring comprises a sintered titanium alloy.

In additional or alternative embodiments of any of the foregoing embodiments, one or more fluid passages extend through the first member in communication with the first damping chamber and the second damping chamber.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
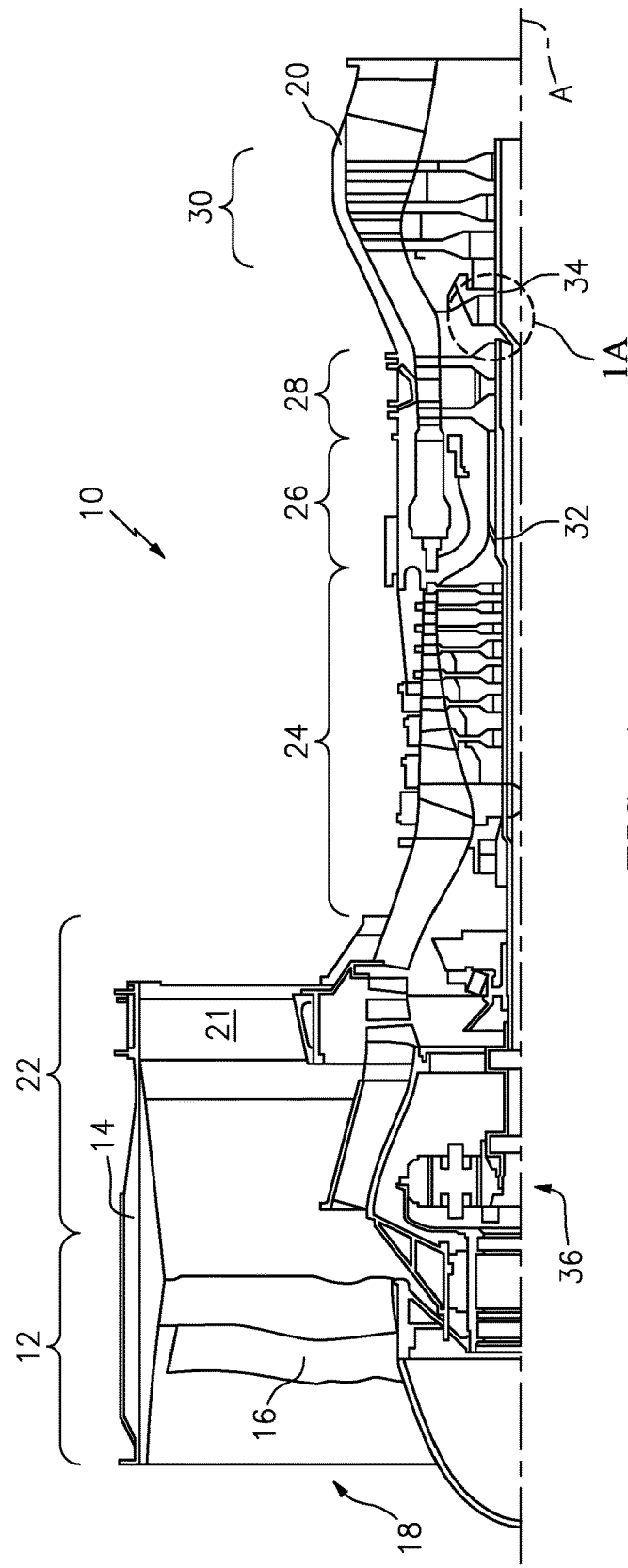
FIG. 1 is a simplified central axial sectional half view of a gas turbine engine.

FIG. 1 shows an exemplary simplified gas turbine engine 10 taken from U.S. Patent Application Publication 20110286836 (the '836 patent) of Davis, Nov. 24, 2011, the disclosure of which is incorporated herein by reference as if set forth at length. Engine 10 includes a fan section 12 within a fan case 14. The fan section 12 includes multiple blades at an inlet 18 of the fan case 14. A core 20 is supported relative to the fan case 14 such as by flow exit guide vanes 21. The core 20 includes a low pressure compressor section 22, a high pressure compressor section 24, a combustor section 26, a high pressure turbine section 28 and a low pressure turbine section 30. In one example, the blades of the low pressure compressor section 22 and low pressure turbine section 30 are supported on a low spool 34 rotatable about an axis A. An epicyclic fan drive gear system (FDGS) 36 couples the low spool rotor to the fan shaft to drive the fan. The blades of the high pressure compressor section 24 and high pressure turbine section 28 are supported on a high spool 32 rotatable about the axis A.

Figure 1A:
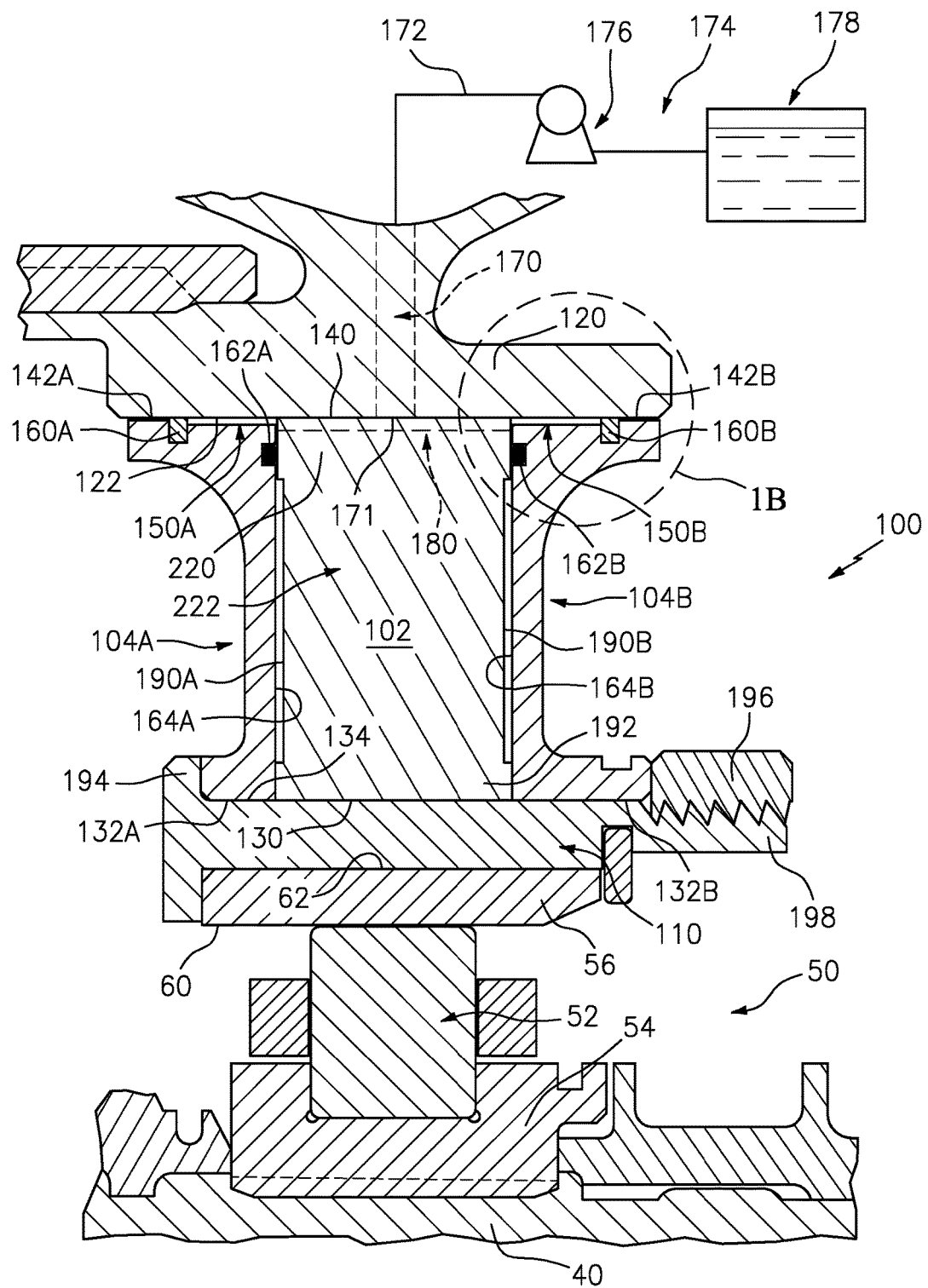
FIG. 1A is an enlarged view of a bearing area of the engine of FIG. 1 including a damper.

FIG. 1A shows one of the main bearings 50 of the engine as a rolling element bearing having one or more circumferential arrays of rolling elements (balls or rollers) 52 radially between an inner race 54 and an outer race 56. The inner race 54 has an inner diameter (ID) surface 60 receiving a shaft 40 of the engine. The exemplary ID surface 60 is splined to mate with splines of the shaft. The outer race 56 has an outer diameter (OD) surface 62.

FIG. 1A specifically shows a spring/damper system 100 radially compliantly mounting the bearing outer race 56 to surrounding structure (e.g., a "grounded" case or another spool). The spring/damper system 100 has a first piece 102 forming a radial spring and a pair of second pieces 104A, 104B forming damper rings (also FIG. 2 which is slightly further schematicized relative to FIG. 1A and omits some FIG. 1A components) at opposite axial sides or ends of the radial spring 102.

The exemplary spring/damper system 100, has a ring 110 holding or mounted to the outer race 56. An inner diameter surface of the ring 110 may abut the outer diameter surface of the outer race 56. An exemplary ring 110 is formed as a stub hub, also holding the damper rings 104A, 104B and radial spring 102 in axial compression.

The exemplary spring/damper system 100 also includes a stationary portion 120 which may be formed as a portion of engine static structure (e.g., of a case hub supporting the shaft or of a rotor hub) or may be formed as a separate piece or assembly mating with such static or rotating structure.

The portion 120 has an inner diameter (ID) surface 122 surrounding the radial spring 102 and the damper rings 104A, 104B. The radial spring 102 and the damper rings 104A, 104B are thus radially sandwiched between the stub hub 110 (as a first or inner member) and the stationary portion 120 (as a second or outer member). Respective inner diameter (ID) surfaces 130, 132A, 132B of the radial spring 102 and the damper rings 104A, 104B may contact the outer diameter (OD) surface 134 of the stub hub 110.

Discussed below, the outer diameter (OD) surfaces 140, 142A, 142B of the radial spring 102 and the damper rings 104A, 104B may have a more complex relationship with the inner diameter (ID) surface 122 of the stationary structure. The exemplary outer diameter (OD) surface 140 of the radial spring 102 has portions 141 (also FIG. 3) contacting the ID surface 122. In the exemplary embodiment, these portions 141 are separated by axial channels 180 (discussed below) that allow fluid communication axially across the radial spring 102.

The surfaces 142A, 142B (FIG. 1A) are locally radially spaced from the surface 122 to create damping chambers 150A, 150B. Each chamber 150A, 150B may be sealed. A respective seal 160A, 160B seals directly between the damper ring 104A, 104B and the ID surface 122. Exemplary such seals 160A, 160B are captured in respective grooves in the surfaces 142A, 142B (e.g., rectangular-sectioned grooves having an axially-extending radially-inboard base and two radially-extending axial end faces/walls). Exemplary such seals 160A, 160B are metallic rings such as piston rings and may be split rings (e.g., wrought iron). Second seals 162A, 162B seal between the respective damper rings 104A, 104B and the radial spring 102. Exemplary such seals 162A, 162B are captured in axially-open channels (e.g., rectangular-sectioned grooves having a radially-extending axially-outboard base and two axial-extending radial end faces/walls) in axially inboard (facing the radial spring 102) faces 164A, 164B of the damper rings 104A, 104B.

The static structure 120 includes one or more passageways 170 for passing fluid (e.g., oil) to the damping chambers 150A, 150B. The passageway(s) 170 have outlet(s) (port(s)) 171 along the ID surface 122 and may be connected via conduits 172 to an oil supply system (source) 174 (e.g., having a pump 176 drawing oil from a reservoir 178). The oil supply system 174 may be a conventional such system and additional features such as oil collection and return are not shown.

In operation, fluid pressure in the damping chambers 150A, 150B axially biases the first seals 160A, 160B into engagement with the associated groove axially-outboard end surface and biases the second seals 162A, 162B into engagement with the radially-inboard surface of the associated groove.

To pass the oil from the port(s) 171 to the chambers 150A, 150B, the exemplary radial spring 102 has channels 180 (FIG. 3—e.g., axial grooves) in its OD surface 140. The channels 180 are exposed to the port(s) 171 at the OD surface 140 and to the chambers 150A, 150B at axial end surfaces of the radial spring 102 to provide fluid communication from the oil supply system 174. Additionally, the exemplary channels 180 may provide cross communication between the two chambers 150A, 150B to provide pressure balancing.

Damper operation is otherwise conventional with the oil in the chambers 150A, 150B damping radial excursions of the damper rings 104A, 104B relative to the static structure 120 and thus of the shaft 40 relative to the static structure.

Several further details of the exemplary configuration are discussed below and some or all of these may be practiced together or separately in any physically appropriate combination.

In the exemplary embodiment, the radial spring 102 is held axially compressively sandwiched between the damper rings 104A, 104B near the ID surfaces 130, 132A, 132B thereof. Near the OD surfaces 140, 142A, 142B thereof, there will be differential movement with the OD surface 140 of the radial spring 102 maintaining its position relative to the static structure 120 and the OD surfaces 142A, 142B of the damper rings 104A, 104B moving toward and away from the adjacent portion of the static structure 120 ID surface 122. To achieve this, the radial spring 102 and damper rings 104A, 104B are configured to be axially spaced apart from each other along most of a radial span of the radial spring 102. In the exemplary embodiment, the damper ring 104A, 104B faces 164A, 164B are purely flat radial faces (except for the seal grooves). Thus, to provide the gaps, the adjacent axial faces (surfaces) 190A and 190B are provided with large recessed regions outboard of an inner annular band 192. Along the inner band 192, the faces 190A, 190B form associated rim surfaces abutting in compressive engagement with adjacent portions of the surfaces 164A, 164B. Exemplary axial compression is maintained by capturing one of the damper rings 104A, 104B against a radially outwardly protruding flange 194 of the stub hub 110 while the other damper ring 104A, 104B is held compressed by a stack nut 196 on an end portion 198 of the stub hub. In the exemplary implementation, the bearing 50 outer race 56 is axially captured by the combination of a radially inwardly directed flange of the stub hub 110 and a separate retaining ring in an ID groove on the stub hub. Myriad other configurations are possible.

To facilitate sealing at the seals 162A, 162B, the clearance provided by the recessing of the faces 190A, 190B is reduced at an outer band portion 220. At this portion 220, the faces 190A, 190B also form axial rims but with a slightly smaller separation than the rims of the ID band 192 leaving clearance with the damper rings 104A, 104B.

Figure 2:
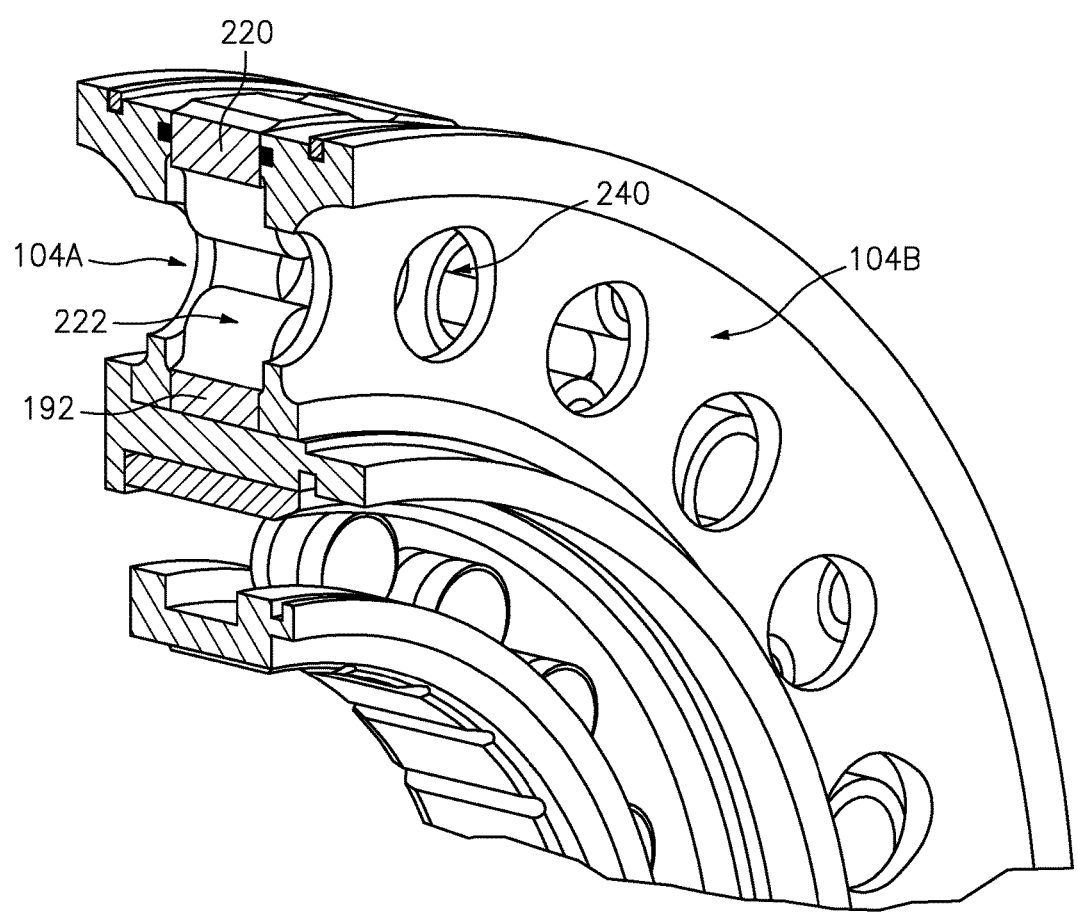
FIG. 2 is a cutaway view of a bearing and damper subassembly.
Figure 3:
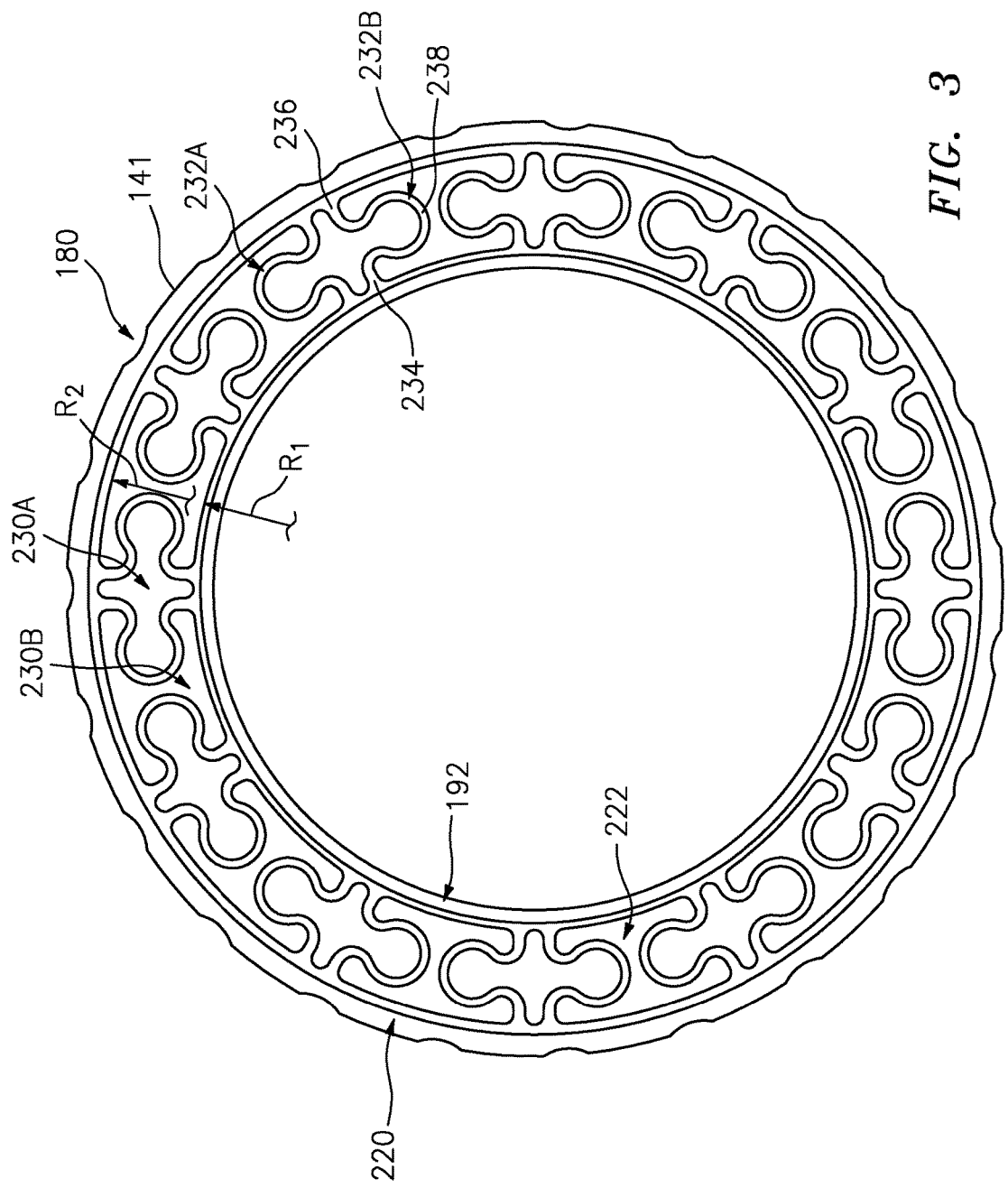
FIG. 3 is a plan view of a radial spring of the damper of FIG. 2.

FIGS. 2 and 3 show a convoluted radial compliant portion 222 between the ID band 192 and OD band 220. The exemplary portion 222 has, when viewed axially (FIG. 3), a substantial open area 230A, 230B fraction to provide compliance. An exemplary open area fraction is at least 75% of the area between the bands (e.g., measured from the radial position $R_1$ of the most inboard open area to the radial position $R_2$ of the outboardmost open area). Exemplary open areas 230A, 230B are separated by pairs of radial spring 102 arms 232A, 232B with the areas 230A formed between arms of a given pair and the areas 230B formed between adjacent arms of two adjacent pairs. The assignment, however, may be reversed and structures other than the paired arms and the particular paired arms may be used, including configurations from the '814 patent. Each exemplary arm 232A, 232B has an inboard end 234 and an outboard end 236. A protuberant portion 238 of substantially uniform thickness in planform extends between the two ends and protrudes circumferentially so as to be able to flex to provide the radial compliance of the radial spring 102.

Figure 1B:
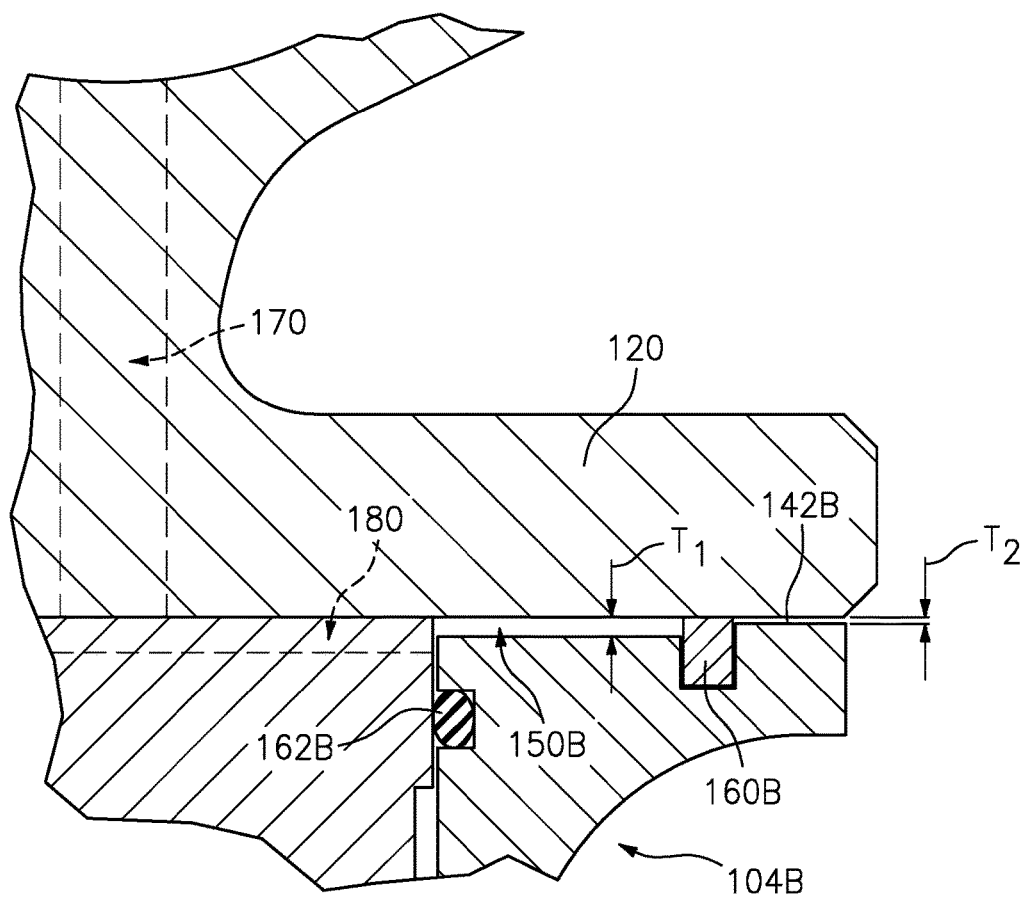
FIG. 1B is a further enlarged view of a damping chamber of the bearing area of FIG. 1A.

As a further detail of conventional damper construction, exemplary damping chambers 150A, 150B are shown as having a neutral (with members centered) radial span or thickness $T_1$ (FIG. 1B). Beyond the seal 160A, 160B gap between the damper ring 104A, 104B OD surfaces 142A, 142B and static structure 120 ID surface 122 may be smaller, having a radial span $T_2$. This smaller radial span provides a stop gap that functions to limit the radial displacement of the rotor during rotor excursions or periods of excessive vibrations and protect areas involved in sealing.

At least for a mid-thrust gas turbine engine, exemplary centered damping chamber radial span $T_1$ is from greater than zero to 40 mils (1.0 mm) (e.g. (1.0 mil to 40 mils (25 micrometer to 1.0 mm) or 5.0 mils to 40.0 mils (13 micrometer to 1.0 mm) or 5.0 mils to 35.0 mils (13 micrometer to 0.89 mm)). Exemplary stop gap radial span $T_2$, if present, is smaller than $T_1$ (e.g., at least 1.0 mil (25 micrometer) smaller or an exemplary 5.0 mils to 20 mils (13 micrometer to 0.50 mm) smaller.

Manufacture may be by conventional materials and techniques (e.g., additive manufacture or pure machining of the radial spring 102 and pure machining of the damper rings 104A, 104B and stub hub 110 from alloys such as steels or titanium alloys such as on a lathe). Exemplary additive manufacture techniques (e.g., electron beam melting (EBM) or direct metal laser sintering (DMLS)). An exemplary titanium alloy for additive manufacture of the spring is Ti6Al4V Also, various surfaces in sliding contact with other components may be polished for smoothness and low friction and/or formed by an anti-friction or wear-resistant coating on the associated metallic substrate. For example, a coating might be a hard face coating such as titanium nitride or a diamond-like coating (e.g., diamond-like carbon (DLC) or diamond-like nanocomposite (DLN)) applied such as by flame spray, plasma spray, or vapor deposition.

Figure 4:
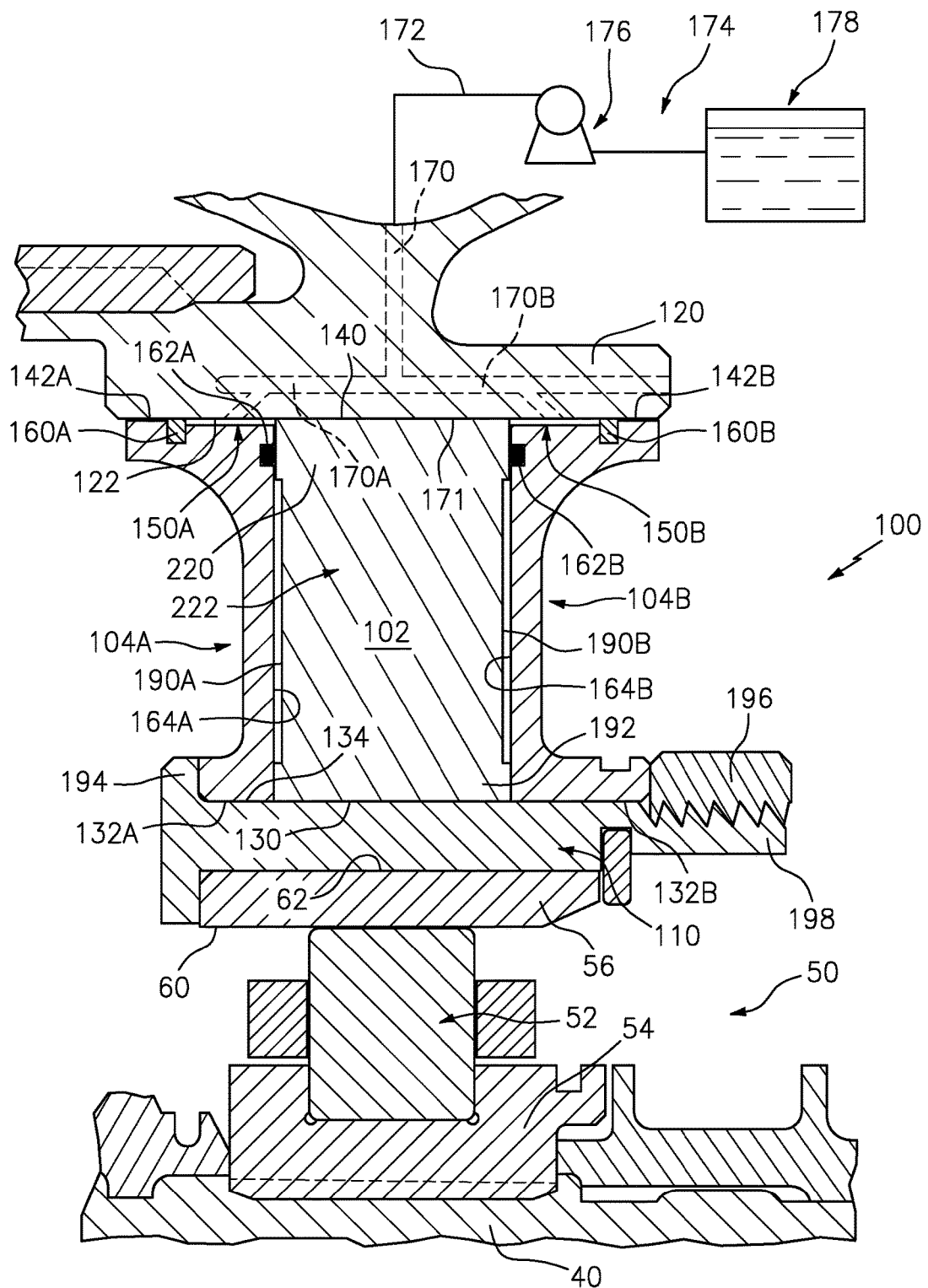
FIG. 4 is an alternative enlarged view of a bearing area of the engine of FIG. 1.

FIG. 4 shows an alternative configuration wherein the FIG. 1A passageway 170 branches into branches 170A, 170B with respective outlets 171A, 171B along the respective chambers 150A, 150B. This avoids the need for the channels 180 of FIG. 3. Additionally, if the cross-sectional area of the branches 170A, 170B is small enough (either overall or at a limiting orifice or restriction), it will limit pressure equalization between the chambers 150A, 150B to allow the arrangement to act as if there were two separate, semi-independent dampers. This semi-independence may provide any of several advantages. Failure of one seal 160A, 160B, 162A, 162B of one chamber 150A, 150B will have less influence on the other chamber and thus provide greater residual damping. Also it may offer a different relationship between the pure radial damping and damping of a pitching/yawing motion (rotation of the inner member about an axis transverse to the centerline A).

Additionally, there may be axial asymmetries. For example, the radial spring constants or dimensions of the two damper rings 104A, 104B may differ from each other. Differences in radial spring constant may be effected by differences in ring web thickness or size/distribution of holes 240 (FIG. 2), if any. Other geometrical differences may affect the length and/or radial span of the associated damping chamber or the associated stop gap. The asymmetry may be used to achieve any of various different benefits. For example, it may be used to effect particular damping of pitching/yawing discussed above. This may be particularly relevant where there are axial asymmetries in the engine structure (e.g., a short length to the next radial bearing on one axial side and a longer length (or cantilever situation) on the other side).

The use of "first", "second", "third", "fourth", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A machine comprising:
   a first member;
   a second member;
   a bearing having an inner race mounted to the second member and an outer race rotatable relative to the inner race about an axis;
   a ring holding the outer race;
   a radial spring extending radially between the ring and the first member;
   a first damper ring extending radially between the ring and the first member at a first axial side of the radial spring;
   a first damping chamber radially between an outer diameter surface portion of the first damper ring and an inner diameter surface portion of the first member;
   a second damper ring extending radially between the ring and the first member at a second axial side of the radial spring; and
   a second damping chamber radially between an outer diameter surface portion of the second damper ring and an inner diameter surface portion of the first member.

2. The machine of claim 1 wherein the radial spring comprises:
   an inner diameter band;
   an outer diameter band; and
   a compliant portion between the inner diameter band and the outer diameter band.

3. The machine of claim 2 wherein in transverse cross-section, the compliant portion has an open area fraction of at least 75%.

4. The machine of claim 2 wherein the outer diameter band has an outer diameter surface having channels providing fluid communication between the first damping chamber and the second damping chamber.

5. The machine of claim 1 further comprising:
   one or more fluid passages through the first member in communication with the first damping chamber and the second damping chamber.

6. The machine of claim 1 further comprising:
   a first seal between the first damper ring and the first member; and
   a second seal between the second damper ring and the first member.

7. The machine of claim 6 wherein:
the first seal is in an outer diameter groove in the first damper ring; and
the second seal is in an outer diameter groove in the second damper ring.

8. The machine of claim 6 wherein:
the first seal is a metallic ring; and
the second seal is a metallic ring.

9. The machine of claim 6 further comprising:
a third seal between the first damper ring and the radial spring; and
a fourth seal between the second damper ring and the radial spring.

10. The machine of claim 1 wherein the ring holds the first damper ring, the radial spring, and the second damper ring under axial compression.

11. The machine of claim 1 wherein the radial spring comprises a sintered titanium alloy.

12. The machine of claim 1 being a gas turbine engine.

13. A method for using the machine of claim 1, the method comprising:
driving relative rotation of the first member and second member; and
introducing a liquid to the first damping chamber and the second damping chamber, the chambers accommodating radial vibration and the liquid in the chambers damping the radial vibration.

14. A machine comprising:
a first member;
a second member;
a bearing having an inner race mounted to the second member and an outer race rotatable relative to the inner race about an axis;
between the first member and the bearing outer race:
a radial spring;
a first damper ring at a first axial side of the radial spring, a first damping chamber radially between an outer diameter surface portion of the first damper ring and an inner diameter surface portion of the first member; and
a second damper ring at a second axial side of the radial spring, a second damping chamber radially between an outer diameter surface portion of the second damper ring and an inner diameter surface portion of the first member.

15. The machine of claim 14 wherein the radial spring comprises a sintered titanium alloy.

16. The machine of claim 14 further comprising:
one or more fluid passages through the first member in communication with the first damping chamber and the second damping chamber.

* * * * *